Oct. 30, 1951     C. F. SCHUMACHER     2,573,281
LISTER ATTACHMENT
Filed July 14, 1947     2 SHEETS—SHEET 1
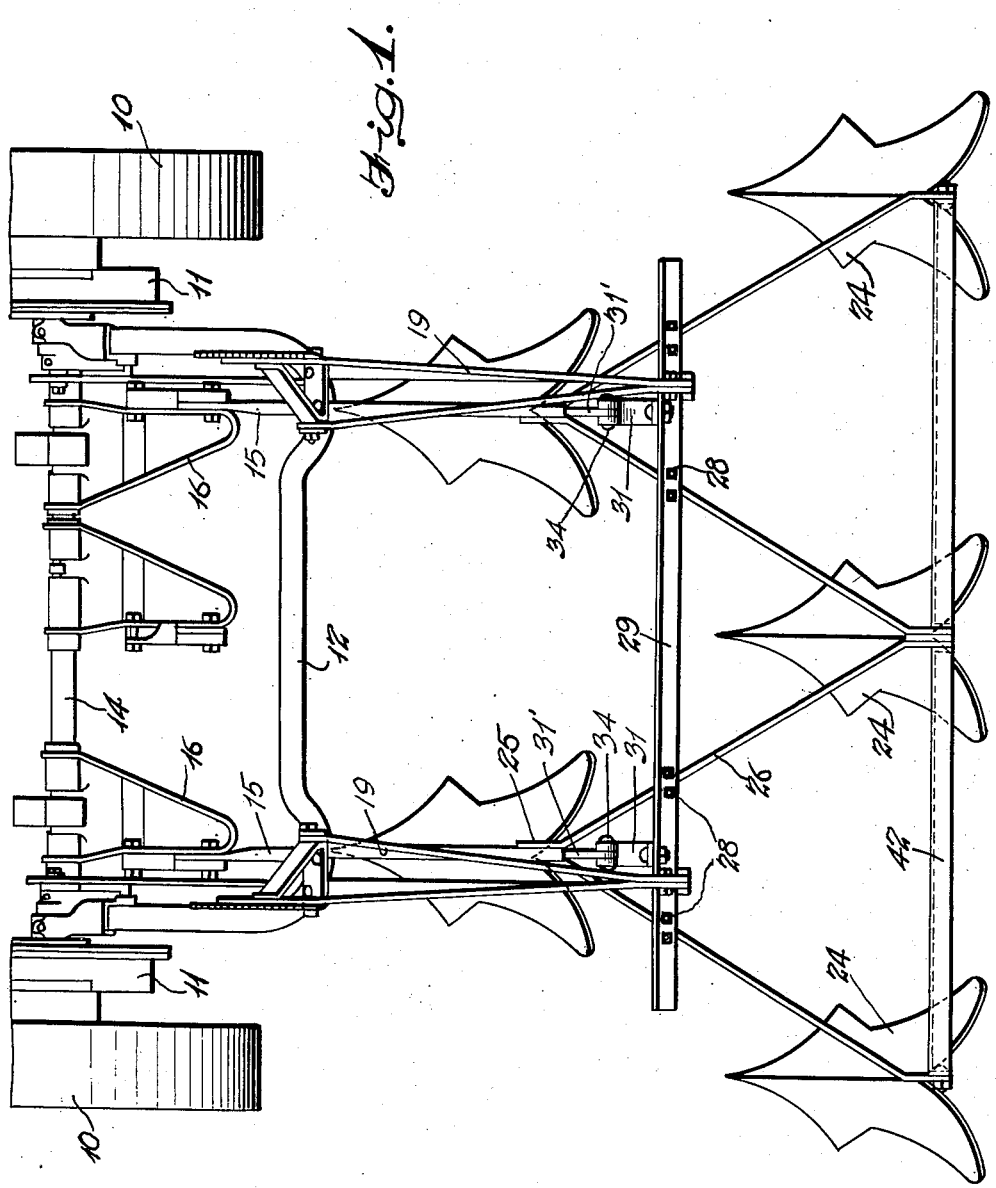
INVENTOR.
Charles F. Schumacher
BY Victor J. Evans & Co.
ATTORNEYS Oct. 30, 1951 C. F. SCHUMACHER 2,573,281
LISTER ATTACHMENT
Filed July 14, 1947 2 SHEETS—SHEET 2
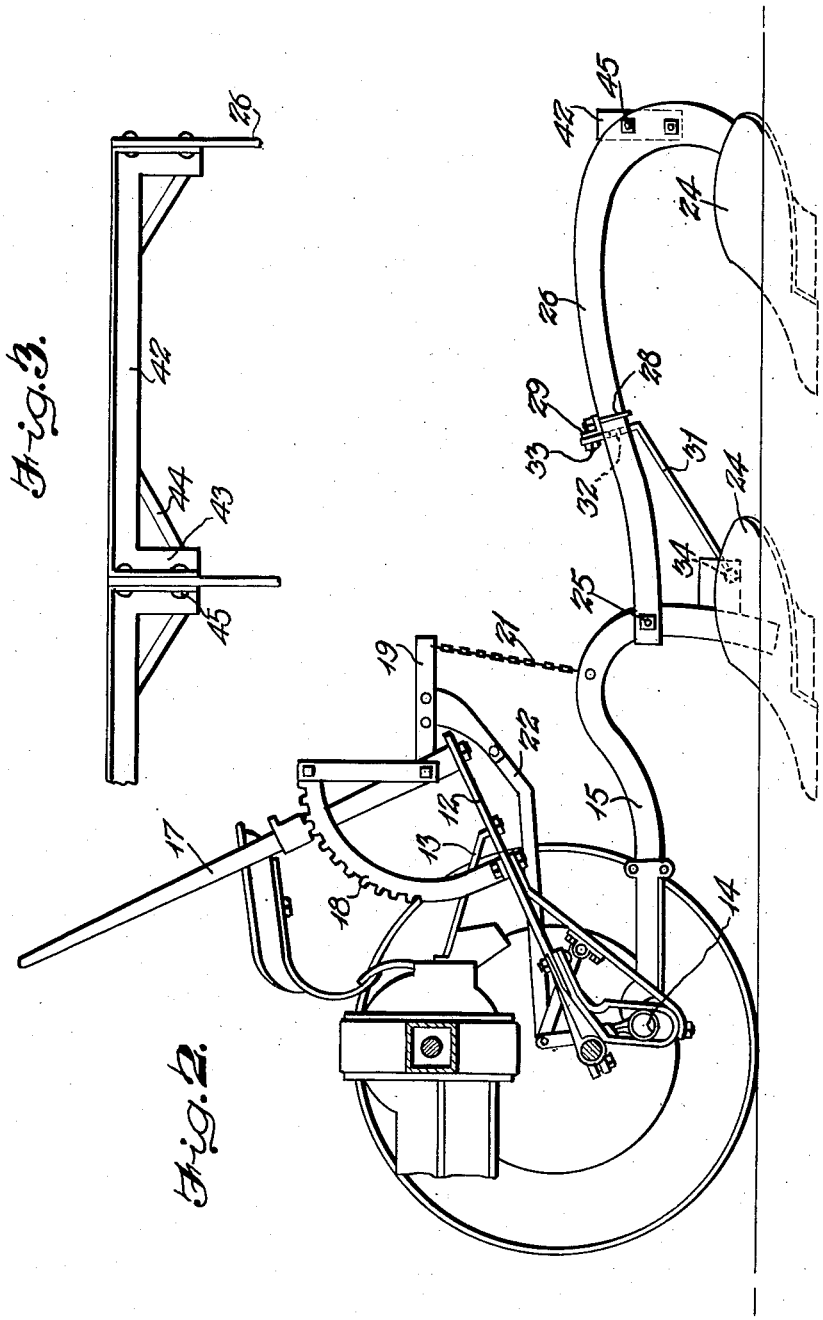
INVENTOR.
Charles F. Schumacher
BY Victor J. Evans & Co.
ATTORNEYS Patented Oct. 30, 1951

2,573,281

UNITED STATES PATENT OFFICE 2,573,281

LISTER ATTACHMENT

Charles F. Schumacher, Munday, Tex.

Application July 14, 1947, Serial No. 760,807

1 Claim. (Cl. 97—129)

This invention relates to tractor mounted implements and more particularly to implements for working the ground.

It is an object of the present invention to provide an attachment which can be connected to a standard lister implement already connected to a tractor whereby to provide additional working tools to the lister implement so that other operations and the mere listing of the ground can be effected independently of the listers and by merely adjusting the new attachment to the ground working position.

Other objects of the present invention are to provide an attachment adapted to be connected to a standard beam type tractor mounted lister which is of simple construction, inexpensive to manufacture and efficient in operation.

For a better understanding of the invention, reference may be had to the following detailed description taken in connection with the accompanying drawing, in which Fig. 1 is a plan view of a tractor with a standard lister mounted thereon and of the attachment embodying the features of the present invention and wherein the lifting devices of the tractor are connected to the attachment.

Fig. 2 is a cross-sectional view of the rear axle structure of a tractor with a standard lister mounted thereon and of the attachment embodying the features of the present invention and wherein the lifting devices of the tractor are connected to the standard lister.

Fig. 3 is a detail and fragmentary view, in rear elevation, showing the transverse brace members between the beams of the attachment.

Referring now to the figures, 10 represents a tractor having a drop axle housing 11 with a transversely extending draw bar 12 connected thereto and retained in a raised position by a brace 13. A transverse bar 14 extends between the drop axle housings, and lister beams 15 are pivotally connected to this bar 14 by hitch connections 16 having portions sufficiently spaced to retain the beam against lateral movement. On the U-shaped draw bar 12 is an adjusting lever 17 adapted to be operated over a ratchet 18 fixed to the bar. As shown in Fig. 2, an arm 19 extends rearwardly from the lever 17 and is connected by a chain 21 with the lister beam 15. The lifting arm 19 is connected by a link 22 with the hitch mechanism 16 whereby to elevate the hitch point simultaneously with the lifting of the beam 15.

The attachment of this invention provides mounting means for cultivator shoes or sweeps 24 which are pivotally connected to the beams 15 as indicated at 25, by beams 26 and these beams may have the same shape as the beams 15 of the lister attachment. Extending across the beams 26 and attached thereto by U-bolts 28 is a transverse bar 29. On this bar there are braces 31 which support the beams 26 and shoes from the lower ends of the beams 15 in a plurality of positions as indicated by the holes 32 whereby to elevate or lower the beams 26 to vary the working depth of the shoes 24. Bolts 33 in the end of the braces 31 may be positioned in any one of the holes 32. The braces 31 are connected as at 34 with plates 31' rigidly mounted on the rear end of the beams 15.

The ends of the beams 26 of the auxiliary attachment are connected together by inverted U-shaped tie-bars 42. These tie-bars are shown more clearly in Fig. 3 and have downwardly extended arms 43 with braces 44. The downwardly extended arms 43 of the tie-bars are connected together by bolts or rivets 45 through the ends of the beams 26. While one kind of shoe 24 is illustrated it will be apparent that other types of tools can be connected to the beam 26. By adding this attachment to the lister beam implement the work of higher priced implements can be performed. The attachment can be made at a very low cost. The attachment can be used as a chisler or spring tooth harrow. Also cultivator sweeps can be attached to the beams 26 and to the regular beams 15.

While various changes may be made in the detail construction it shall be understood that such changes will be within the spirit and scope of the present invention as defined by the appended claim.

I claim:

In an attachment for a farm implement having tool carrying beams, the combination which comprises a plurality of tool carrying horizontally disposed beams having downwardly extended rear ends on which cultivator shoes are carried, inverted U-shape frames with diagonal braces in the corners thereof positioned between the downwardly extended rear ends of the beams of the attachment and on which the said cultivator shoes are carried, means securing the ends of the frames to the beams whereby the downwardly extended rear ends of the beams are supported in upright positions, the forward ends of said beams having attaching means thereon for connecting the beams to the tool carrying beams of the implement, the said tool carrying beams of the attachment extended diagonally laterally from the points of attachment thereof with the tool carrying beams of the implement whereby cultivator shoes carried thereby are positioned in staggered relation to cultivator shoes of the beams of the implement, a cross beam spaced toward the rear from the forward ends of the beams of the attachment extended over and secured to the diagonally disposed sections of the beams, and diagonally disposed braces extended downwardly and forwardly from said cross beam for engagement with parts of the downwardly extended ends of the tool carrying beams of the implement for supporting the said horizontally disposed beams of the attachment, said braces having spaced bolt holes therethrough for adjusting the elevation of the beams of the attachment and thereby adjusting the elevation of the said cultivator shoes thereon.

CHARLES F. SCHUMACHER.

REFERENCES CITED

The following references are of record in the file of this patent:

UNITED STATES PATENTS

| Number | Name | Date |
|---|---|---|
| 485,308 | Weatherman | Nov. 1, 1892 |
| 536,509 | Carter | Mar. 26, 1895 |
| 1,492,870 | Viles | May 6, 1924 |
| 1,575,485 | Holman et al. | Mar. 2, 1926 |
| 1,769,085 | Trial | July 1, 1930 |